Figure 1:
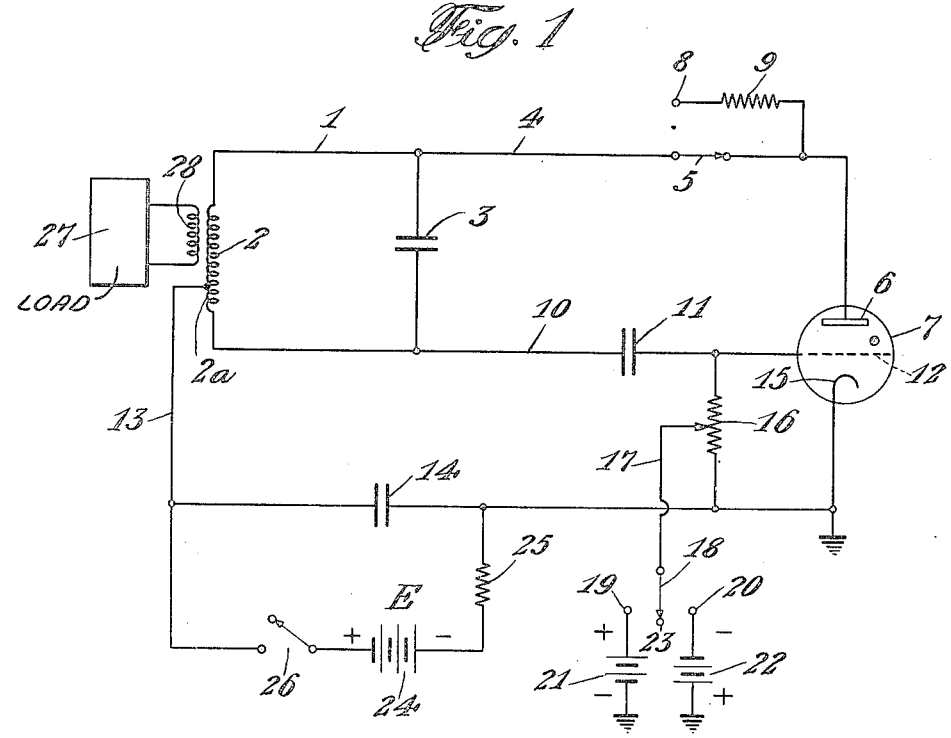

April 4, 1950          M. ROSSNICK          2,502,671

ELECTRICAL INVERTER SYSTEM

Filed Oct. 23, 1945

INVENTOR
Melvin Rossnick
BY
ATTORNEYS

Patented Apr. 4, 1950

2,502,671

UNITED STATES PATENT OFFICE 2,502,671

ELECTRICAL INVERTER SYSTEM

Melvin Rossnick, Bronx, N. Y., assignor to Induction Heating Corporation, New York, N. Y., a corporation of New York Application October 23, 1945, Serial No. 623,919½

5 Claims. (Cl. 250—36)

1

This invention pertains to electrical inverter systems for converting direct current into alternating current of a selected frequency.

In accordance with the basic principles of the invention, a resonant circuit of oscillatory characteristics, comprising an inductance in parallel with a capacity, is subjected to periodic shock excitation from a direct current voltage source, by means of a grid-controlled gaseous discharge tube, such as a thyratron, provided with an exciting circuit linking the resonant circuit with the thyratron grid for appropriately firing the tube, and an extinction circuit including a condenser shunting the direct voltage source, for thereafter extinguishing the tube, whereby the thyratron operates as an automatic, electrical switch between the voltage source and the resonant circuit. Owing to the periodic shock excitation thus imposed on the resonant circuit, sustained oscillations will be established therein, of sine wave form, and the energy of which may be delivered to a load circuit coupled to the resonant circuit.

In its preferred form, the invention employs but a single grid-controlled space discharge tube, and is accordingly extremely simple in construction and operation, as well as efficient. The power output and the oscillation frequency are easily controlled, the output frequency being a sine wave function of time. By appropriate selection of the circuit constants, the system may be designed to operate at any desired frequency within a range extending, for practical purposes, from about 1000 cycles per second up to about 20,000 cycles per second, although frequencies outside the range may be obtained if desired.

Figure 2:
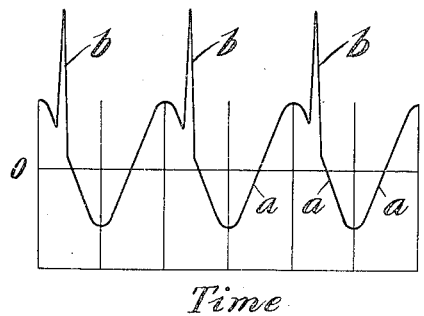

In the drawings:

Fig. 1 shows the preferred circuit arrangement of apparatus in accordance with the invention; while Fig. 2 is a graph illustrating its principles of operation.

Referring to Fig. 1, there is shown a resonant circuit 1, comprising a coil 2 connected in parallel with a condenser 3. The resistance of this circuit is sufficiently low that it will undergo damped oscillations when subjected to a pulse of shock excitation, the damping being kept as low as possible. The upper terminal of circuit 1 is connected over a conductor 4, and through a switch 5, either directly, as shown, to the anode 6 of a grid-controlled gaseous discharge tube 7, such as

2 a thyratron, or switch 5 may be operated to a contact 8 for including in the connection a current-limiting impedance 9, such as a small inductance or resistance. The lower terminal of circuit 1 is connected over a lead 10 and through a grid-blocking condenser 11 to the thyratron control grid 12.

At a point near its grid-connected end, coil 2 is tapped to a connection 13 which extends through a condenser 14 to the grounded thyratron cathode 15. A grid-biasing resistor 16 is directly connected between the control grid 12 and the cathode 15. This circuit, comprising the tapped portion 2a of coil 2, the aforesaid connections 10 and 13, grid-blocking condenser 11 and biasing resistor 16, is an exciting circuit for applying to the control grid a biasing potential derived from the oscillatory energy in resonant circuit 1, for purposes of firing tube 7 at an appropriate point in each cycle of operation, as explained below.

A tapped connection 17 extends from resistor 16 to the movable arm of a switch 18, whereby a fixed positive or negative bias may be optionally applied to the grid by operating the switch arm to either of contacts 19 and 20, having positive and negative voltage sources 21 and 22 connected thereto respectively. Switch terminal 23 is open for optionally omitting such fixed biasing voltage from the grid, as shown in the drawing.

For energizing the system, a source of direct current voltage 24, of magnitude E, supplied from a rectifier circuit, direct current generator or the like, has its negative terminal connected through a resistance 25 to the thyratron cathode 15, and its positive terminal connectable, upon closure of a switch 26, to the thyratron anode 6, over the circuit comprising conductor 13, resonant circuit 1, and conductor 4. It will be noted that condenser 14 bridges the direct voltage supply circuit 24, 25, 26, the significance of which will be brought out below. Alternating current power is transferred from the resonant circuit 1 to a load circuit 27 by means of a coil 28 coupled to coil 2.

In the system above described, circuit 1 is the resonant circuit in which sustained oscillations are produced by periodic shock excitation from voltage source 24, effected through the medium of the gaseous discharge tube 7 functioning as an electrical switch for automatically connecting the voltage source to the resonant circuit for a brief instant during each cycle of operation and for thereafter disconnecting the same. It will be noted in this connection that when the battery switch 26 is closed, the direct current voltage source 24 is connected in series with the resonant circuit 1 through resistance 25 and the gaseous discharge path, i. e., the cathode-anode path of tube 7, so that if the tube is fired the voltage of source 24 will be suddenly impressed on the resonant circuit to produce shock excitation and accompanying oscillations therein.

Without limiting myself to any particular theory of performance, the following is offered in explanation of the circuit operation.

Prior to closure of switch 26, condensers 3, 11 and 14 are fully discharged and tube 7 extinguished. Assuming the switch now to be operated to the closed position, condenser 14 charges up from direct voltage source 24 through the current-limiting resistor 25. As condenser 14 approaches the full voltage charge E corresponding to the voltage of source 24, the voltage across its terminals causes a charging current to flow through the grid resistor 16 to charge the grid-blocking condenser 11, this current flow being in such direction as to swing the grid momentarily positive and then negative, as the charge on condenser 11 accumulates. During this interval, the full voltage E across condenser 14 is also impressed between the cathode and anode of tube 7, over the series circuit including conductors 4 and 13 and resonant circuit 1. The voltage thus impressed across the space path of tube 7, combined with the momentary positive swing of the grid as aforesaid, causes tube 7 to fire, whereupon its space path resistance drops abruptly to an extremely low value. The voltage across condenser 14 is thus suddenly impressed across the resonant circuit 1, causing condenser 14 to discharge and charge up condenser 3 almost instantaneously substantially to the full voltage E of source 24, except for the small voltage drop across the now fully ionized tube 7. Condenser 14 will thus continue to discharge up to the point where its polarity starts to reverse, at which point tube 7 is thereby extinguished. Condenser 3 concurrently discharges in oscillatory fashion through coil 2, owing to the low damping of the resonant circuit 1. As a result of this oscillatory discharge in resonant circuit 1, the thyratron plate voltage will be swung alternately more and less positive with respect to the cathode. Meantime, owing to the aforesaid excitation circuit 10, 13 coupling the resonant circuit 1 to the thyratron grid 12, the grid will be swung alternately negative and positive, but with a phasing such, due to condenser 11 and biasing resistor 16, that shortly after the plate voltage attains its maximum value during each cycle of oscillations, the grid will be swung sufficiently positive to fire the tube, resulting in a repetition of the cycle aforesaid. In this way, sustained oscillations of substantially pure sinusoidal output may be established and maintained, so long as switch 26 remains closed to connect the direct current voltage 24 to the circuit.

It will be noted that in the operation as above described, the circuit 2a, 10, 13, 11, 16 linking the resonant circuit 1 with the grid 12, functions as an exciting circuit to fire tube 7 at the appropriate instant during each cycle of operation; while condenser 14 in shunt to voltage source 24 acts as an extinction circuit to extinguish the tube shortly after it is fired.

Fig. 2 shows graphically instantaneous values for current or voltage in the resonant circuit 1, plotted as ordinates against time as abscissae. The sinusoidally varying portions of the graph, as depicted at $a$, represent the oscillatory current in the resonant circuit, while the sharply peaked portions $b$ show the charging periods while the thyratron is firing. It will be noted that the charging periods $b$ constitute but an extremely small fraction of the cyclical variation $a$ of current or voltage in the resonant circuit. This short firing time thus gives a long de-ionization time for recovery of the tube between firing intervals.

By way of summary, it may be stated that the oscillatory circuit 1 is energized by successive pulses of current through the thyratron tube 7. These pulses are automatically initiated by means of excitation signals to the grid of the tube supplied from the tapped coil portion 2a through condenser 11 to the grid 12; and said pulses are thereafter automatically extinguished by discharge of condenser 14 through tube 7 and condenser 3.

In order to limit the current flow in the space path of tube 7, and thereby to protect the tube against the flow therein of excessively high currents, it is preferable to operate switch 5 to contact 8, thereby to include a small current-limiting impedance 9, which may be a small resistance or inductance, in series with the space path of the tube 7.

In the grid-exciting circuit 2a, 10, 13, 16, 11, the condenser 11 serves, in one function, to block the direct current voltage 24 off of the grid. The strength of the grid signal is determined by the tapping point of conductor 13 to coil 2, by the magnitude of condenser 11, and also by the magnitude of the biasing voltage produced on the grid through resistance 16. The combination of condenser 11 and resistance 16 also acts as a phasing network which controls the phase of the grid voltage as compared to the plate voltage. By appropriately adjusting the values of condenser 11 and resistance 16, this phasing may be varied as desired for any particular operation. In order for the tube to be in a non-conducting state for the remainder of each cycle, following the brief interval during which it is fired, and thus to be ready to fire and conduct the energizing impulse at the proper time of the next cycle, the discharge in the tube must be promptly extinguished, and the tube must have time to lose its conductivity and to de-ionize before the next impulse. This is largely the function of condenser 14, across which the direct current voltage source 24 is connected.

By way of indicating the magnitudes of the various circuit components, the following data is given for the system of Fig. 1, as designed to produce sustained oscillations having a frequency of about 4000 cycles per second:

| | |
|---|---|
| Coil 2 | 10 millihenries |
| Tapped coil portion 2a | 40 microhenries |
| Condenser 3 | 0.1 microfarad |
| Inductance 9 | 150 microhenries |
| Condenser 11 | 0.13 microfarad |
| Condenser 14 | 0.5 microfarad |
| Resistance 16 | 15,000 ohms |
| Resistance 25 | 470 ohms |
| Thyratron 7 | gas filled thyratron |
| Direct current source 24 | 2700 volts |
| Positive biasing voltage 21 | 50 volts |
| Negative biasing voltage 22 | 50 volts |

In the operation of the circuit, under no-load conditions, the plate voltage swings to a maximum of about 5400 volts positive and to a minimum of about 1080 volts negative, giving a total voltage swing of about 6480 volts.

I claim:

1. A system for converting direct current into alternating current, comprising: a gaseous discharge tube having anode, cathode and control grid electrodes; an output circuit extending between said anode and cathode, said output circuit containing a condenser in series with a resonant circuit of oscillatory characteristics, the latter comprising inductance and capacity in parallel; means for impressing a source of direct current voltage in series with a resistance, across said condenser; and a circuit coupled to said resonant circuit and including a condenser in series with said control grid and a resistance connected between said control grid and cathode for impressing between said control grid and cathode a biasing voltage derived from said resonant circuit; said system being constructed and arranged to provide sustained oscillations of a preselected frequency, upon connection of said direct current source thereto.

2. A system for converting direct current into alternating current, comprising: a gaseous discharge tube having anode, cathode and control grid electrodes; an output circuit extending between said anode and cathode, said output circuit containing a condenser in series with a resonant circuit of oscillatory characteristics, the latter comprising inductance and capacity in parallel; means for impressing a source of direct current voltage in series with a resistance across said condenser; a resistor connected between said cathode and control grid; and a connection extending from said resonant circuit through a condenser to said control grid; said system being constructed and arranged to provide sustained oscillations of a preselected frequency, upon connection of said direct current source thereto.

3. A system for converting direct current into alternating current, comprising: a gaseous discharge tube having anode, cathode and control grid electrodes; a resonant circuit, of oscillatory characteristics, comprising inductance and capacity in parallel; a connection containing a current-limiting impedance extending between said resonant circuit and said anode; a condenser connected between said cathode and said resonant circuit; means for impressing a source of direct current voltage in series with a resistance across said condenser; a connection, containing a condenser, extending between a terminal of said resonant circuit and said control grid; and a resistance connected between said control grid and cathode.

4. A system for converting direct current into alternating current, comprising: a gaseous discharge tube having anode, cathode and control grid electrodes; a resonant circuit of oscillatory characteristics, comprising a coil in parallel with a condenser; connections extending from the opposite terminals of said resonant circuit to said anode and control grid respectively, said grid connection containing a condenser in series therewith; a resistance connected directly between said cathode and control grid; a condenser connected between said cathode and an intermediate point on said coil; and means for applying a source of direct current voltage in series with a resistance, across said last-mentioned condenser.

5. A system for converting direct current into alternating current, comprising: a gaseous discharge tube having anode, cathode and control grid electrodes; a resonant circuit of oscillatory characteristics, comprising a coil in parallel with a condenser; connections extending from the opposite terminals of said resonant circuit to said anode and control grid respectively; a current-limiting impedance included in said anode connection; a condenser included in said grid connection; a resistance connected between said cathode and control grid; a condenser connected between said cathode and an intermediate point on said coil; and means for impressing a source of direct current voltage in series with a resistance, across said last-mentioned condenser.

MELVIN ROSSNICK.

REFERENCES CITED

The following references are of record in the file of this patent:

UNITED STATES PATENTS

| Number | Name | Date |
| --- | --- | --- |
| 1,937,369 | Willis | Nov. 28, 1933 |
| 2,098,051 | Lord | Nov. 2, 1937 |
| 2,237,135 | Depp | Apr. 1, 1941 |
| 2,287,542 | Vang | June 23, 1942 |
| 2,295,585 | Lindquist | Sept. 15, 1942 |
| 2,390,659 | Morrison | Dec. 11, 1945 |
| 2,391,894 | Gorham et al. | Jan. 1, 1946 |

OTHER REFERENCES

Journal Scientific Instruments, October 1936, vol. 13, No. 10, pp. 331–33, Thyratron Operated Wave Generator by Rajam.